United States Patent Office 3,114,707
Patented Dec. 17, 1963

3,114,707
PROCESS FOR THE CONTROL OF BACTERIA
Edward B. Hodge, Terre Haute, Ind., assignor to Commercial Solvents Corporation, New York, N.Y., a corporation of Maryland
No Drawing. Filed Apr. 10, 1961, Ser. No. 101,645
6 Claims. (Cl. 252—8.55)

My invention relates to the control of bacteria in water flooding operations used in the secondary recovery of petroleum oils, and more particularly, to controlling such organisms by incorporating into the flooding water amounts of nitrotetrahydrooxazines having the following structural formula:

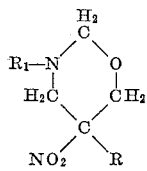

where R is lower alkyl and where $R^1$ is selected from the group consisting of lower alkyl, and lower hydroxyalkyl.

U.S. Patent 2,839,467 lists many of the problems found in the secondary oil recovery art and the means whereby some of these problems have been solved. The problem of controlling sulfate reducing bacteria is ever present and always difficult, as the growth of the microorganisms is not controlled by economically practicable amounts of many bactericides generally utilized in bacterial control and the microorganisms sometimes become resistant to generally used bactericides.

The problems attending the control of microorganisms other than those of the sulfate reducing type are more easily solved but are, nevertheless, present. These microorganisms are generally controlled by moderate amounts of known bactericides.

I have now discovered that noxious microorganisms present in water flooding operations are economically controlled by my above-described nitrotetrahydrooxazines. Compounds which I have found to be operative in my process include 3-(2-hydroxyethyl)-5-methyl-5-nitrotetrahydro-1,3,oxazine,
3-(1-hydroxymethylcyclohexyl)-5-methyl-5-nitrotetrahydro-1,3-oxazine,
3-(1-hydroxymethylpropyl)-5-methyl-5-nitrotetrahydro-1,3-oxazine,
3-n-butyl-5-ethyl-5-nitrotetrahydro-1,3-oxazine,
3-n-butyl-5-methyl-5-nitrotetrahydro-1,3-oxazine,
3-cyclohexyl-5-ethyl-5-nitrotetrahydro-1,3-oxazine,
5-ethyl-3-(hydroxy-t-butyl)-5-nitrotetrahydro-1,3-oxazine, and,
5-ethyl-3-[1,1-bis(hydroxymethyl)-ethyl]-5-nitrotetrahydro-1,3-oxazine.

The usual procedure for the treatment of water to be utilized in flooding operations is to produce a concentrate of the bactericide in water and then continuously inject this concentrate into the water to be used in flooding operations at a rate which forms a desired dilution of the bactericide. This is done prior to pumping the water into the oil-bearing subterranean formation. Sampling and checking the water for bacteria will show whether the chemical concentration needs to be raised or may be lowered to control effectively all bacterial growth and to effect an elimination of sulfate-reducing bacteria from the water.

Alternately, the bactericides utilized in my process may be added to the oil-bearing formations periodically, for example, once a week as a high potency concentrate or the undiluted bactericide may be injected into the formation.

I have found that the compounds utilized in my process are effective against some strains of bacteria in water at concentrations as low as about 5 p.p.m. However, I prefer to utilize concentrations in excess of about 10 to 100 p.p.m. as I have found that even very resistant strains of sulfate-reducing bacteria such as *Desulfovibrio desulfuricans* are effectively controlled at these concentrations.

It is to be understood, of course, that not all of the compounds utilized in my process are effective to the same degree. The following table sets out concentrations at which I have found nitrotetrahydrooxazines coming within the scope of my invention to be completely effective against a resistant strain of sulfate-reducing bacteria, *Desulfovibrio desulfuricans*, in water flooding operations.

| Nitrotetrahydrooxazines: | Effective concentration (p.p.m.) |
|---|---|
| 5-ethyl-3-(2-hydroxypropyl)-5-nitrotetrahydro-1,3-oxazine | 25–50 |
| 5-ethyl-3(hydroxy-t-butyl)-5-nitrotetrahydro-1,3-oxazine | 25–50 |

The following examples illustrate the use of my nitrotetrahydrooxazines for the control of sulfate-reducing microorganisms in water flooding operations. It is not intended that my invention be limited to the exact compositions or concentrations shown. Rather, it is intended that all equivalents obvious to those skilled in the art be included within the scope of my invention as claimed.

Example I

In a water treatment plant, a water concentrate containing 5-ethyl-3-(2-hydroxypropyl)-5-nitrotetrahydro-1,3-oxazine is continually added to water to be pumped into a subterranean oil-bearing formation at such a rate that a 50 p.p.m. solution of 5-ethyl-3-(2-hydroxypropyl)-5-nitrotetrahydro-1,3-oxazine is formed. The nitrotetrahydrooxazine treated flooding water is pumped into the oil-bearing formation and is completely effective in preventing bacterial plugging of the oil-bearing sands and the piping system utilized in the water flooding operations.

Example II

Utilizing the process of Example I, I have found that 50 p.p.m. of 5-ethyl-3(hydroxy-t-butyl)-5-nitrotetrahydro-1,3-oxazine is effective in controlling sulfate-reducing bacteria in water flooding operations.

Example III

Utilizing the process of Example I, I have found that 100 p.p.m. of 5-methyl-3-(2-ethylhexyl)-5-nitrotetrahydro-1,3-oxazine is effective in controlling sulfate-reducing bacteria in water flooding operations.

Now having described my invention, what I claim is:
1. In the process of secondary oil recovery characterized by the step of injecting flooding water into oil-bearing subterranean formations to displace portions of the residual oil therein, the improvement comprising having present in said injected flooding water in excess of about 5 p.p.m. of a nitrotetrahydrooxazine having the following structural formula:

wherein R is lower alkyl and wherein $R^1$ is selected from the group consisting of lower alkyl, and lower hydroxyalkyl.

2. In a flooding process for the recovery of oil from oil-bearing subterranean formations, the improvement which comprises flooding the oil-bearing subterranean formation with an aqueous liquid containing in excess of about 5 p.p.m. of a nitrotetrahydrooxazine having the following structural formula:

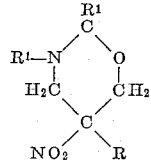

wherein R is lower alkyl and wherein $R^1$ is selected from the group consisting of lower alkyl, and lower hydroxyalkyl.

3. The process of claim 2 wherein the nitrotetrahydrooxazine is 3-(2-hydroxyethyl)-5-methyl-5-nitrotetrahydro-1,3-oxazine.

4. The process of claim 2 wherein the nitrotetrahydrooxazine is 3-(1-hydroxymethylcyclohexyl)-5-methyl-5-nitrotetrahydro-1,3-oxazine.

5. The process of claim 2 wherein the nitrotetrahydrooxazine is 5-ethyl-3-(hydroxy-t-butyl)-5-nitrotetrahydro-1,3-oxazine.

6. The process of claim 2 wherein the nitrotetrahydrooxazine is 3-n-butyl-5-ethyl-5-nitrotetrahydro-1,3-oxazine.

References Cited in the file of this patent

UNITED STATES PATENTS

| | | |
|---|---|---|
| 2,692,231 | Stayner et al. | Oct. 19, 1954 |
| 2,867,279 | Cocks | Jan. 6, 1959 |
| 2,911,294 | Eden | Nov. 3, 1959 |
| 2,960,433 | Eden | Nov. 15, 1960 |
| 2,976,236 | Bennett et al. | Mar. 21, 1961 |

FOREIGN PATENTS

| | | |
|---|---|---|
| 107,419 | Australia | May 11, 1939 |
| 421,189 | Italy | Mar. 19, 1947 |

UNITED STATES PATENT OFFICE
CERTIFICATE OF CORRECTION

Patent No. 3,114,707                  December 17, 1963

Edward B. Hodge

It is hereby certified that error appears in the above numbered patent requiring correction and that the said Letters Patent should read as corrected below.

Column 3, lines 9 to 15, the formula should appear as shown below instead of as in the patent:

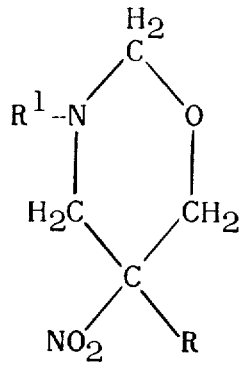

Signed and sealed this 16th day of June 1964.

(SEAL)
Attest:

ERNEST W. SWIDER                  EDWARD J. BRENNER
Attesting Officer                Commissioner of Patents